UNITED STATES PATENT OFFICE.

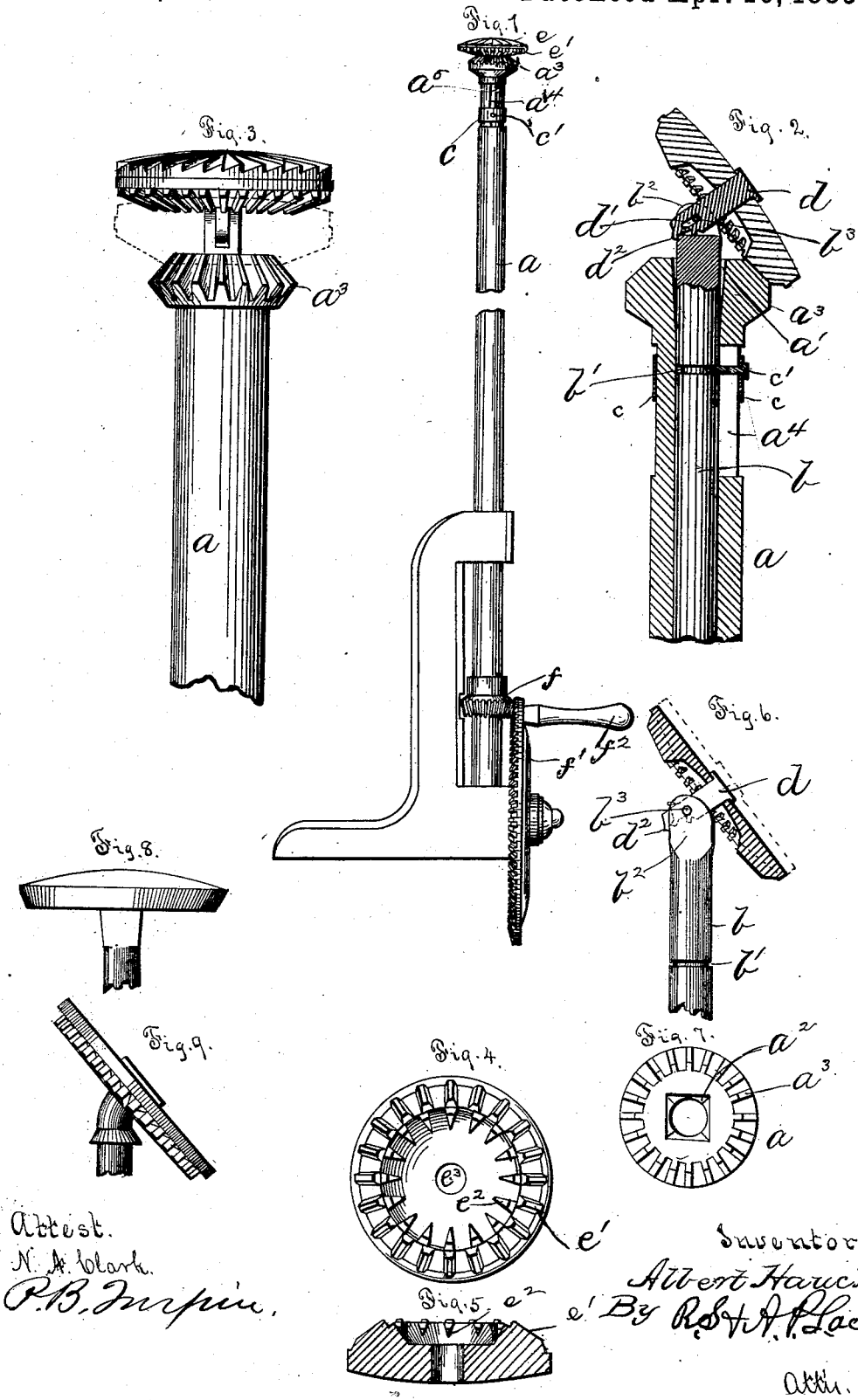

ALBERT HAUCK, OF JEWETT, OHIO.

PEG-CUTTER.

SPECIFICATION forming part of Letters Patent No. 275,648, dated April 10, 1883.

Application filed January 15, 1883. (No model.)

*To all whom it may concern:*

Be it known that I, ALBERT HAUCK, a citizen of the United States, residing at Jewett, in the county of Harrison and State of Ohio, have invented certain new and useful Improvements in Peg-Cutters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has relation to improvements in peg cutters or rasps; and it consists in the construction, combination, and arrangement of the several parts, as will be hereinafter fully described, and specifically pointed out in the claims.

In the drawings, Figure 1 is a side view of my machine. Fig. 2 is a detached vertical section of the same. Figs. 3, 8, and 9 show modifications. Fig. 4 is an inverted plan of the gear-wheel secured on the rasp. Fig. 5 is a cross-section of the same. Fig. 6 is a detail view of the stem, and Fig. 7 is a plan view of the shaft.

$a$ is the operating-shaft, which is made hollow its entire length, or from a short distance from its top, as may be desired. The opening $a'$ through it may be square its entire length, or may be made round its entire length; but it is preferably made, as shown in Figs. 2 and 3, with the round portion extending nearly to the top and opening at the top into the angular portion $a^2$, as shown. The shaft is provided at its outer end with a bevel-gear wheel, $a^3$, formed or suitably secured thereon.

The object of my invention is to provide a shoe-rasping machine in which the motive-shaft is made hollow at its outer end, and is provided with a bevel-gear wheel thereon, and the rasp is provided with a bevel-gear wheel meshed with the wheel on the shaft, and is secured on a stem which is placed in the hollow end of the shaft, so that the shaft may revolve independently of the stem, and also to furnish other improvements, as will be described. This may be secured by the construction shown in Figs. 1 and 2, or those shown in Figs. 3, 8, and 9. In Fig. 3 the stem is placed in the opening $a'$, and a bracket is pivoted to the stem and the rasp is journaled thereon, so that it can be turned down so that the teeth on its under side can be meshed with those of the wheel $a^3$. The upper end of the stem is made angular, as shown, so that when the rasp is brought down, as shown in dotted lines, Fig. 3, the angular portion of the stem will engage the angular hole $a^2$, and the rasp will be revolved. In Fig. 8 the rasp is secured directly to the stem, and in Fig. 9 the upper end of the stem is turned so as to bring the gear-teeth of the rasp which is journaled therein directly in mesh with those of the wheel $a^3$. I prefer, however, the construction shown in Figs. 1, 2, and 3, and which I will now describe.

The shaft is arranged near its outer end with the slot $a^4$ running with the length of the shaft, as shown, and made of a length sufficient to permit the movements of the stem hereinafter described.

$a^5$ is a notch leading to one side from the said slot $a^4$, as shown in Fig. 1.

$b$ is the stem, provided with the circumferential groove $b'$ and bifurcated at its upper end, as shown, forming the jaws $b^2$ $b^2$, between which the pin $b^3$ extends, as shown.

$c$ is a sleeve placed on the shaft $a$, as shown.

$c'$ is a pin passed through a threaded opening in the sleeve $c$ or otherwise suitably secured thereto. This pin extends through the slot $a^4$ in the shaft and its end extends into the groove $b'$, as shown in Fig. 2.

$d$ is the bracket on which the rasp is journaled.

$d'$ is a slot or elongated opening in the bracket, through which the pin $b^3$ passes, and the bracket is arranged between the jaws $b^2$, and is constructed with the extension $d^2$, which catches over the edge of the stem between the jaws $b^2$ and holds the bracket and rasp in position when so desired.

$e$ is the rasp, provided on its under side with the outer bevel-gear, $e'$, and the inner bevel-gear, $e^2$, and provided with the central opening, $e^3$, through which the bracket passes. The rasp and teeth may be cast or formed in one piece, in which case the opening $e^3$ would need be countersunk at the top, so that the head of the bracket would not come to the surface of the rasp; or the rasp portion and gear-wheels might be made separately and secured together with the head of the bracket arranged between them. In Figs. 2, 4, 5, 6, and 9, I show the gear-wheel without the rasp. The internal teeth, $c^2$, are preferred, because their use avoids the making of the top of the bore $a'$ of the shaft $a$ angular, and yet connects the rasp and shaft when the latter is lowered to the position indicated in full lines, Fig. 1, and dotted lines, Fig. 3, as the internal teeth then mesh with wheel $a^3$.

In operation the shaft $a$ is revolved either by means of gear-wheels $f$ $f'$ and crank-handle $f^2$, or by other suitable means, the stem $b$ and the several parts being in the position shown in Fig. 1, and a flat rasp is employed. If it is desired to have an inclined rasp, the sleeve $c$ is pushed up to the position shown in Fig. 2, carrying the stem with it, and the sleeve is turned so as to bring the pin $c'$ into the notch $a^5$ and lock the parts in position, and the rasp is then pulled out into about the position indicated in dotted lines, Fig. 6, and then pushed back and brought down, so as to catch the extension over the edge of the stem, as shown in Figs. 2 and 6, and lock the bracket in position.

It will be understood that the stem constructed with groove $b'$ and the sleeve $c$ and pin $c'$ would be useful where the bracket was simply pivoted to the stem, as shown in Fig. 3, and that the locking mechanism, consisting of bracket provided with slot $d'$ and extension $d^2$, would be useful without the sleeve and pin $c$ $c'$; but I prefer the use of both these constructions, as by their use together a firmer construction and better results are had.

By the construction described a simple, compact, and efficient device is provided, free from complications and easy of operation.

The shaft $a$ may be hollow its entire length, or only sufficiently far from its outer end to permit the insertion of the stem, as shown.

Having thus described my invention, what I claim, and desire to secure by Letters Patent, is—

1. In a shoe-rasp or peg-cutter, the combination of a rotary shaft, $a$, provided with a socket-bearing in its upper end, and with a gearing surrounding the open end of the socket-bearing, a stem, $b$, placed loosely in the socket-bearing, a rasp pivoted on the outer end of the stem $b$, and having a gearing on its under side adapted to engage with the gearing on the end of the rotary shaft, and means for rotating the shaft $a$, as and for the purposes set forth.

2. The combination, substantially as described, of a shaft constructed with a slot, $a^4$, and notch $a^5$ projected therefrom, a gear-wheel secured on the end of the shaft, the stem provided with circumferential groove $b'$, a bracket pivoted to the stem and having a rasp journaled thereon, and the sleeve $c$ and pin $c'$, as specified.

3. The combination, with a hollow shaft, and a gear-wheel secured thereon, of the stem, the pin $b^3$, and the bracket having the rasp journaled thereon, and constructed with the slot $d'$ and an extension arranged to extend over the edge of the stem, substantially as described, and for the purposes set forth.

4. The combination, substantially as set forth, of the shaft constructed with slot $a^4$ and the notch $a^5$, the gear-wheel $a^3$, the shaft having the groove $b'$, the pin $b^3$, the bracket constructed with the extension $d^2$, and having the slot $d'$ formed through it, and the rasp journaled on the bracket, substantially as set forth.

5. In a shoe-rasping machine, the combination of the hollow shaft, a bevel-gear wheel secured on the end thereof, a stem placed within the hollow shaft, a bracket pivoted to end of the said stem, a rasp journaled on the said bracket, and series of internal and external teeth formed on or otherwise secured to the under side of the rasp, as and for the purposes specified.

In testimony whereof I affix my signature in presence of two witnesses.

ALBERT HAUCK.

Witnesses:
ANNA WIRT,
GEORGE WIRT.